May 30, 1967 W. T. ENGEL ET AL 3,322,010
MACHINE FOR CUTTING GLASS TUBES
Filed Sept. 17, 1965 4 Sheets-Sheet 1
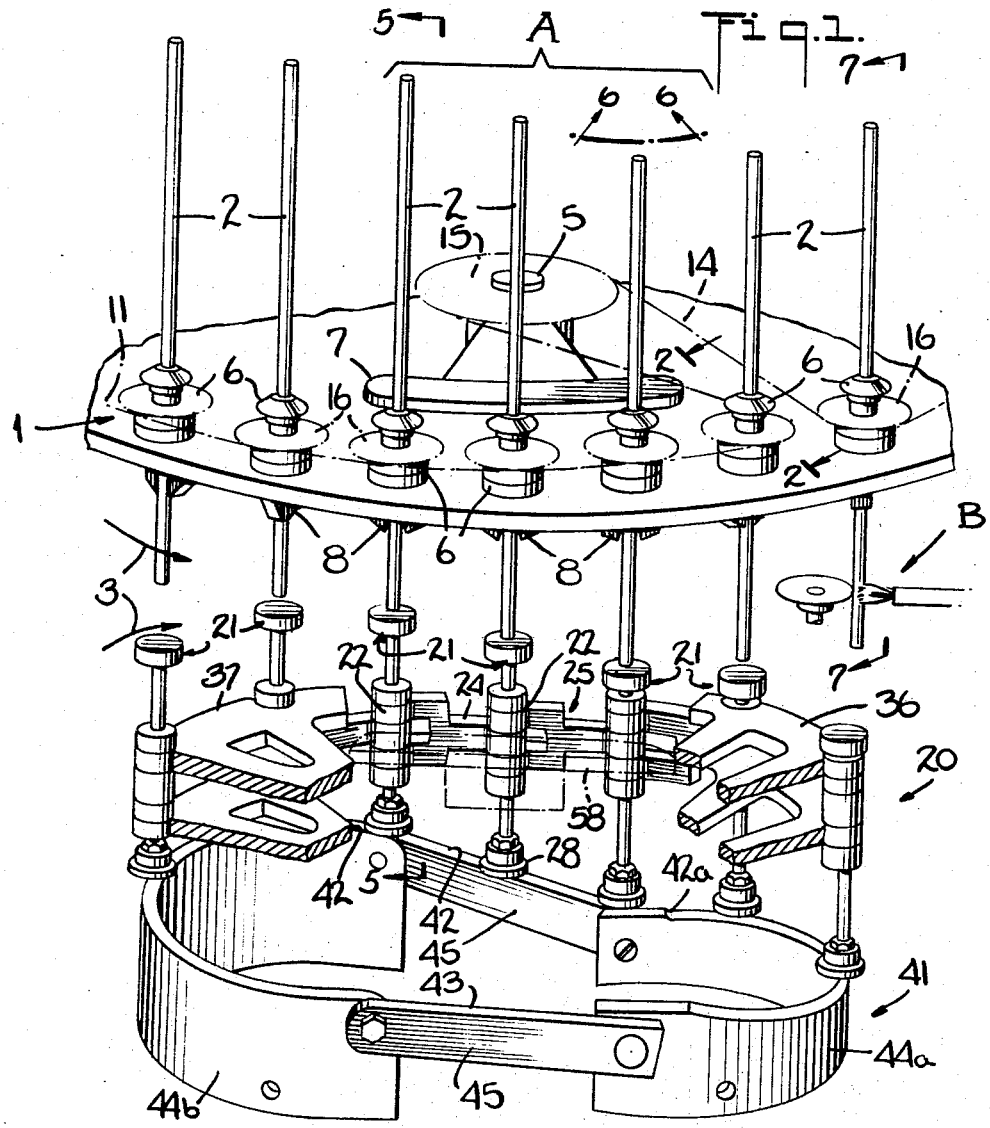
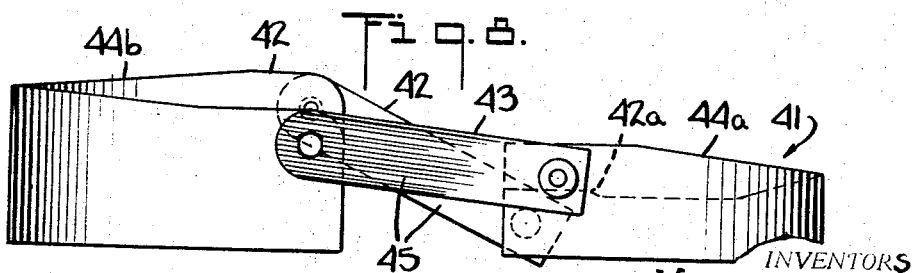
INVENTORS
WILLIAM T. ENGEL
BY HENRY G. HEFLICH
ATTORNEY

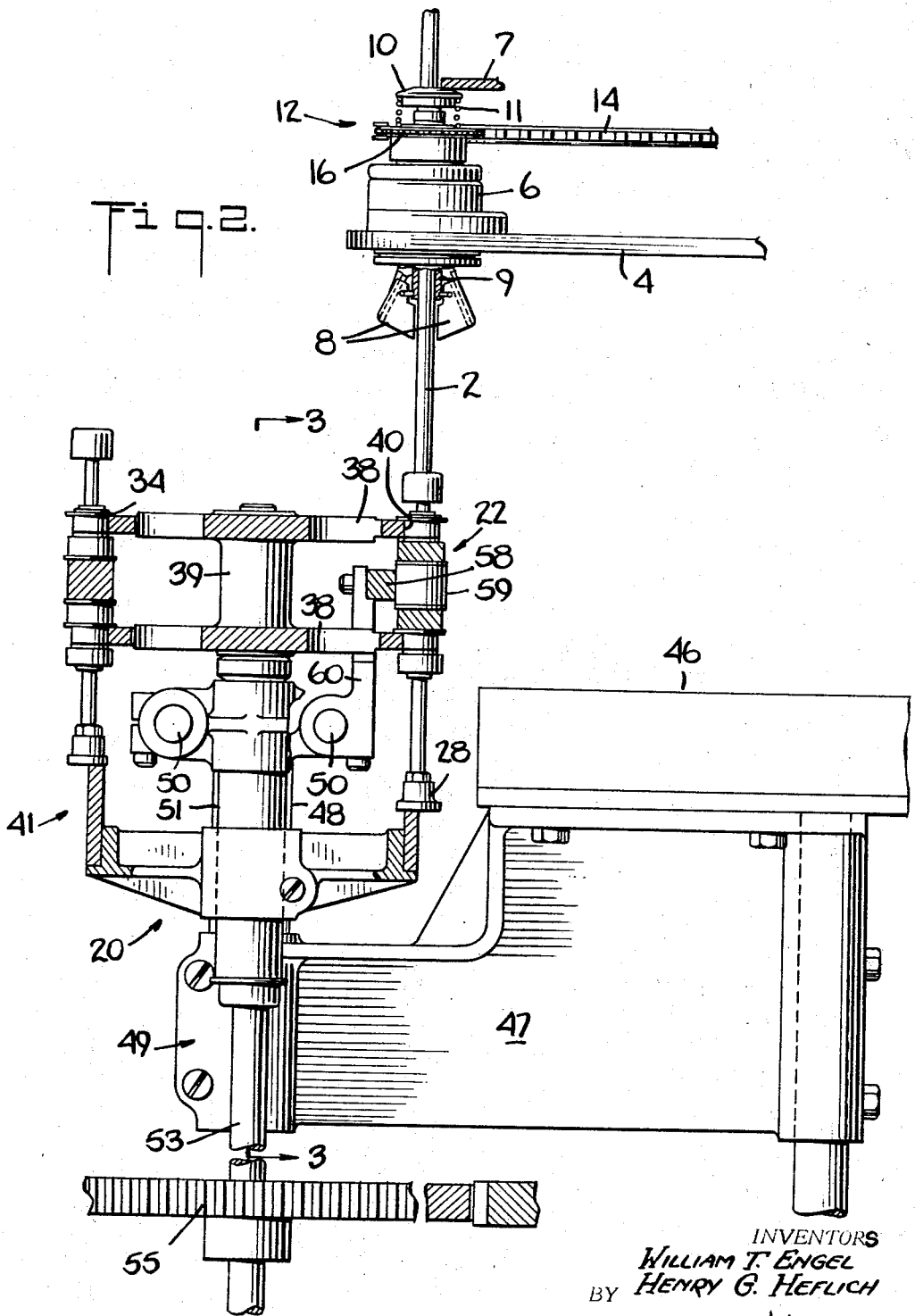

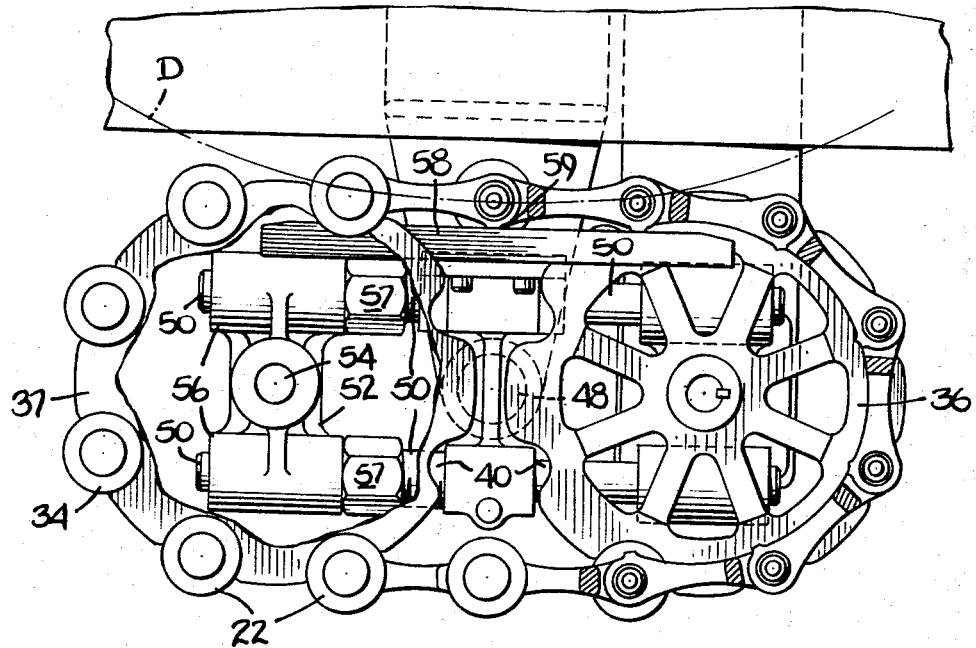
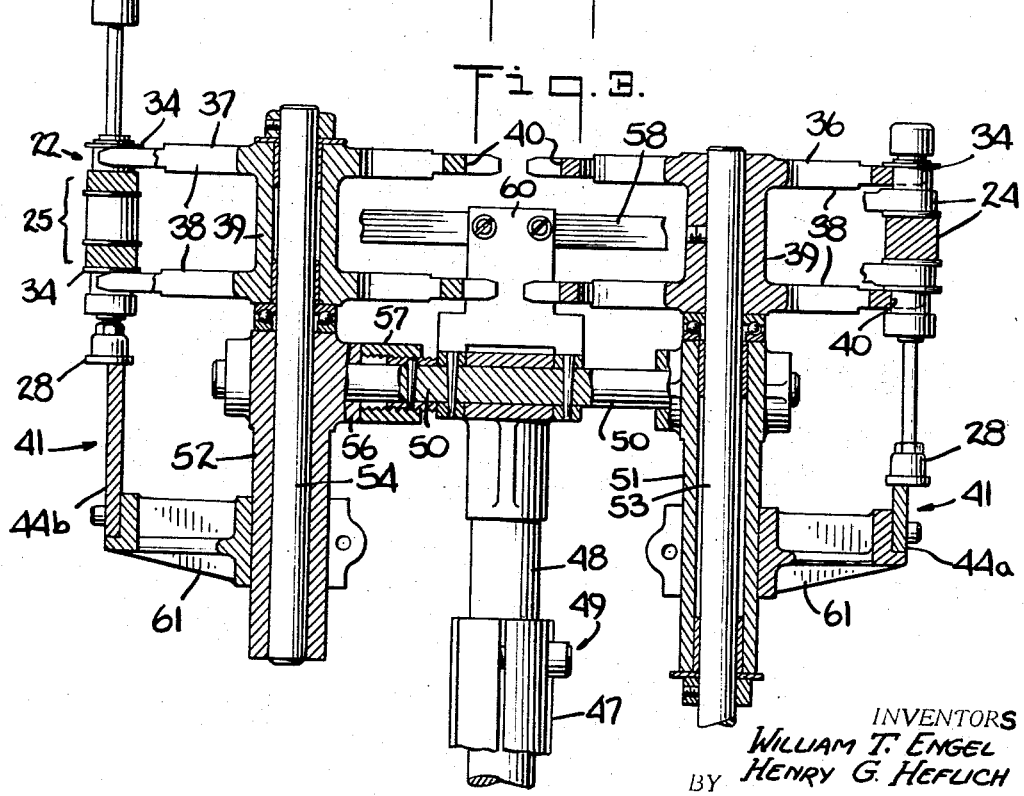
Fig. 4.
Fig. 3.
INVENTORS
WILLIAM T. ENGEL
HENRY G. HEFLICH
BY
ATTORNEY

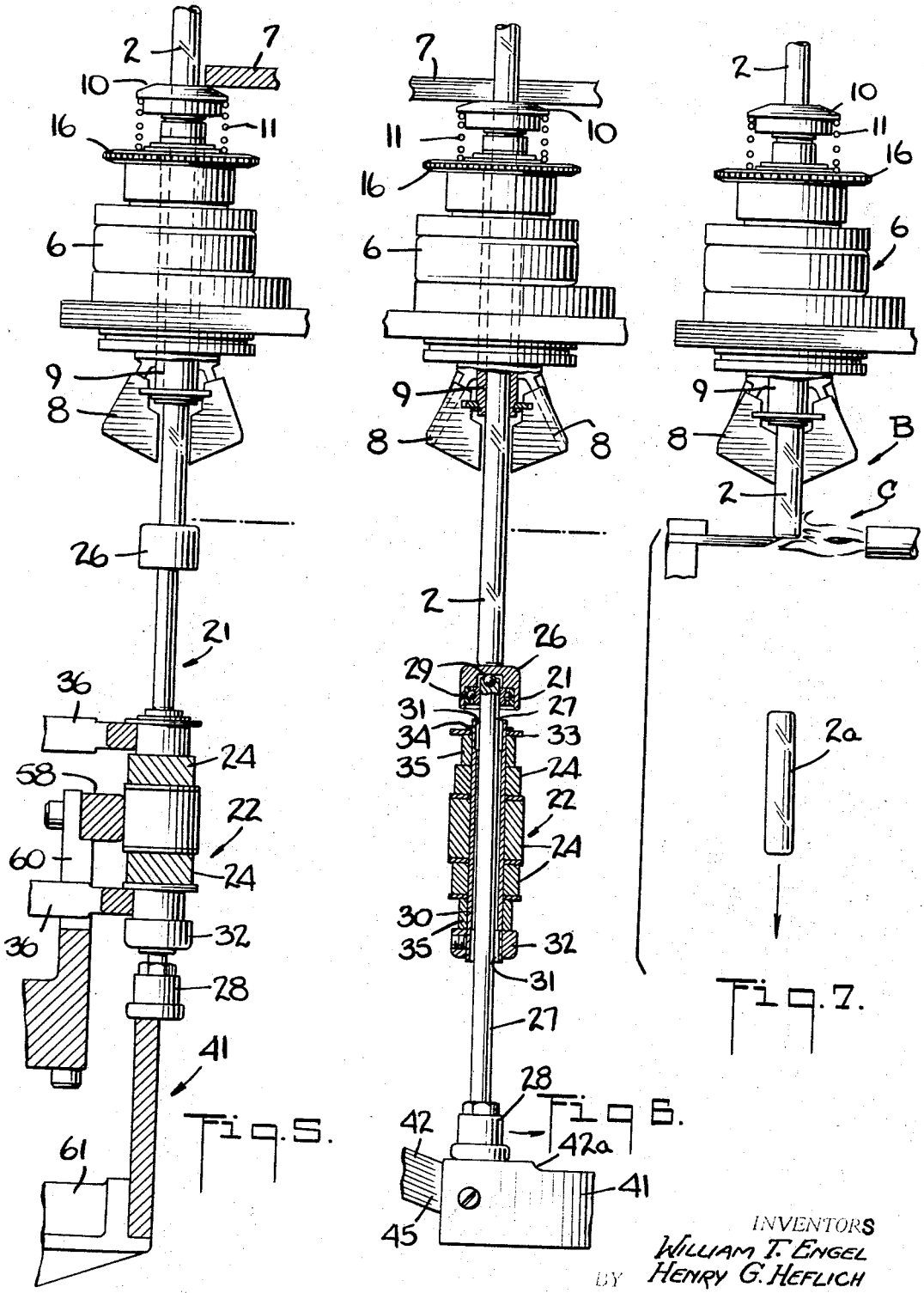

United States Patent Office 3,322,010
Patented May 30, 1967

3,322,010
MACHINE FOR CUTTING GLASS TUBES
William T. Engel, Union, and Henry G. Heflich, Ridgefield, N.J., assignors to Kahle Engineering Co., Union City, N.J., a corporation of New Jersey
Filed Sept. 17, 1965, Ser. No. 488,072
21 Claims. (Cl. 83—170)

The present invention relates to a machine for cutting segments from elongated glass tubes and more particularly to a machine for feeding accurately determined lengths of tube to a cutting station where the segments are severed from the glass tube.

The present invention is directed to a machine wherein a rotating table carries a series of glass tubes to a cutting station. As the upright tubes progress toward the cutting station, the machine feeds the tubes so that a segment of predetermined length will be severed from the tubes by a cutting means. The above cycle is repeated until the tubes have been subdivided into a plurality of segments.

Glass tubing is fragile and care must be taken not to break the tubes during the formation of individual segments. It is also important to avoid chipping the ends of the tubes. Such chipping not only impairs the quality of the glass segments but also serves to foul the tube cutting mechanism. This care is especially important when feeding a predetermined length of tube prior to tube arrival at the cutting station. Consequently the mechanism for handling the glass tubes must be capable of accurate and gentle handling of the glass tubes. More particularly, the tube cutting machine must be free from vibration or lashing of its individual components especially those components which manipulate the tubing during the feeding operation. It is important further that the machine operate at high speed for the efficient production. A further consideration is that the feeding of the tubes must be accurate so that uniform segments are cut from the tube at the cutting station.

The present invention meets these considerations by providing an improved mechanism for feeding glass tubes. In particular the glass tube mechanism of the present invention provides for gradual and accurate feeding of tube lengths prior to the tube's arrival at the cutting station. The present invention provides a tube cutting machine which runs smoothly even at high speeds and which is effective in preventing chipping of the edges of the glass tubes during the feeding operation. The glass tube feeding machine provides for cutting segments of any desired length from tubes. The machine of the present invention may be easily and quickly adjusted without impairing the efficiency or accuracy of the cutting operation.

Accordingly it is an object of the present invention to provide a machine for cutting segments from glass tubes.

Another object of the present invention is to provide a mechanism for feeding a series of glass tubes each of which presents a segment of given length to a cutting tool.

A further object of the present invention is to provide for a gradual feeding of the glass tubes.

Another object of the present invention is to provide a feeding mechanism for glass tubes which runs smoothly regardless of operating speed.

Another object of the present invention is to provide an adjustable feeding mechanism wherein the glass tube cutting machine can produce tube segments in any desired length.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a partial perspective view of a glass tube cutting machine according to the present invention;

FIG. 2 is a side elevational view taken along line 2—2 of FIG. 1 illustrating the tube feed mechanism of the present invention;

FIG. 3 is a sectional view in front elevation taken along line 3—3 of FIG. 2 and illustrating the drive arrangement for the tube feeding mechanism of the present invention;

FIG. 4 is a top plan view corresponding to FIG. 3 and illustrating in particular the overlapping paths of the tube feed mechanism and the tube carrying table;

FIGS. 5, 6 and 7 are elevational views taken respectively along line 5—5, line 6—6 and line 7—7 of FIG. 1 to illustrate the progression of the glass tube through the feeding and cutting operations; and FIG. 8 is a front elevational view of the cam surface used for controlling the length of tube fed during the feeding operation.

Referring now to the drawings and more particularly to FIG. 1, the preferred embodiment of the present invention includes a tube carrying turret 1 which moves a series of vertically disposed tubes 2 from left to right in FIG. 1 through a tube feed zone indicated at A to a cutting station indicated at B. As the turret 1 moves through the feed zone A, each tube is temporarily released for the feeding operation. During the feeding operation each tube is lowered a predetermined feed length for subsequent cutting at station B.

The glass tube carrying turret 1 preferably comprises a table 4 mounted for rotation on a suitable shaft 5. The table includes a series of tube holding chucks 6 for releasably supporting the glass tubes 2 in vertical orientation. Each of the chucks 6 cooperates with a chuck opening cam 7 for releasing a tube 2 during the feed operation. The chuck opening cam 7 therefore defines the length of the feed zone A. That is to say tube feeding occurs when each chuck 6 releases its tube 2 through the intermediation of the chuck opening cam 7. Preferably each of the chucks 6 includes spring loaded jaws 8 for supporting a glass tube 2 on the table 4, and for releasing each tube 2 for vertical gravity feeding as each chuck 6 moves through the feed zone A. As best shown in FIG. 2, the jaws 8 of the chuck are actuated by a spring loaded sleeve 9 which responds to the chuck opening cam 7. In opening the chuck jaws 8, the cam 7 depresses a flange 10 on the hollow sleeve 9 against the bias of a spring 11. When the chuck moves clear of the cam 7 and passes out of the feed zone, the spring 11 pushes the sleeve 9 upward to reclose the jaws 8 for regripping the tube 2.

It will be noted in FIGS. 1 and 2 that each of the chucks 6 may be rotated by a chain and sprocket arrangement 12. This rotation of the tube gives improved cutting action at the cutting station B. The chain and sprocket arrangement 12 includes a chain 14 which interconnects a main sprocket 15 (FIG. 1) and auxiliary sprocket 16 mounted on the chucks 6. If desired, the main sprocket 15 may be stationary with respect to the table 4 so that as the table 4 rotates the chain and sprockets 12 induces each chuck 6 to rotate about its axis.

It will be observed that the chucks rotate in passing through the feed zone A. The rotating chucks therefore will cause the loosely held tubes to rotate casually during the feeding operation. This casual rotation of the tubes will be discussed further in connection with the tube feed mechanism now to be described.

Referring again to FIG. 1, the tube cutting machine further comprises an elevator or tube feed mechanism 20 which is positioned below the tube carrying table for co-operating in the tube feed operation. As each tube is released from its chuck by the chuck opening cam, the tube feed mechanism gradually lowers each tube until the chuck closes and brings the tube to the cutting station.

The preferred tube feed mechanism includes a series of spaced platforms 21 which move in a closed path. A portion of this closed path lies within the feed zone A and each platform moving through the feed zone A is in substantially vertical alignment with glass tubes which are also moving through the feed zone. As the tube feed mechanism 20 moves through its closed path, each platform 21 registers with and moves in timed relation with one of the glass tubes 2 for gradually lowering each tube to a predetermined feed length. One of the important features of the present invention is that each platform 21 be firmly supported to prevent swaying as the platform moves through its closed path. To accomplish this, each platform 21 is supported over a substantial portion of its length within the swivel joint 22 formed by adjacent links 24 of a platform drive chain 25. As shown in FIG. 1 each chain link is preferably Y shaped so that the complementary ends of each link nest in forming an elongated swivel joint.

FIG. 6 illustrates the construction of each platform 21 and its supporting swivel joint 22. Each platform 21 includes a cap 26, a spindle 27, and a cam follower 28 at the bottom of the spindle. The platform cap 26 is mounted in suitable bearings 29 at the top of the vertical spindle 27. I prefer to use these bearings 29 so that the platform cap is free to rotate along with the rotating glass tube during the feeding operation. It will be recalled that each tube 2 rotates casually as it is loosely held by its chuck 6 through the feed zone. The platform cap 26, which is free to rotate, accommodates this causal tube rotation and avoids chipping or stressing the tube.

The platform spindle 27 is mounted for free vertical movement in the hollow swivel joint 22 formed by the adjacent links 24 of the platform drive chain 25. The joint includes a central sleeve 30 having spaced end bearings 31 for receiving the platform spindle 27. These bearings guide the spindle in its free up and down movement and prevent undesired swaying or vibration of the platform 21 in the swivel joint 22. The central sleeve 30 further provides for alignment of the links 24 of the platform drive chain 25. The swivel joint assembly 22 is held fast at its lower end by a collar and set screw 32 and at its upper end by a washer 33 and a retainer ring 34. A pair of collars 35 at the respective ends of the swivel joint 22 mesh with a platform chain drive sprocket 36.

It will be observed therefore that each tube feed platform 21 is free to move vertically and that the cap portion 26 of the platform is free to rotate along with the casually rotating tube to prevent tube damage.

Referring now to FIGS. 1 and 4, the tube feed platforms 21 and drive chain 25 are mounted on a pair of sprockets 36 and 37. The preferred sprockets provide firm support for the feed platform 21 and their drive chain 25. Each sprocket 36 and 37 engages the outer ends of each swivel joint to give accurate vertical orientation and effective support for the chain 25 and platform 21 against swaying or vibration.

The sprockets 36 and 37 for driving and supporting the platform chain 25 are best illustrated in FIGS. 2, 3 and 4. Preferably each sprocket 36 and 37 includes a pair of spaced plates 38 mounted on a common hub 39. Each pair of plates has vertically aligned peripheral grooves 40 which register with the swivel joints 22 for supporting and driving the chain 25. Each swivel joint 22 includes a pair of retainer plates 34 to facilitate mounting the chain on the sprockets.

As the chain 25 as seen in FIG. 1 moves through the closed path, each of the platforms is lowered as the platforms pass through the feeding zone A. In this manner the platforms guide the glass tubes from an upper position to a lower position during the tube feed operation. Preferably the tubes are gradually lowered as they pass through the feed zone. Gradual lowering lends itself to a smoother feeding operation and avoids possible damage to the tubes through abrupt handling.

A feed cam 41 shown in FIGS. 1, 6 and 8 is preferably used to accomplish this. The cam follower 28 at the foot of each platform 21 moves along and down the feed surface 42 of the feed cam 41. This feed surface 42 of the cam 41 is located in the feed zone A and in substantially vertical alignment with both the feed platform 21 and the tubes 2.

One of the important features of the present invention is to provide for abrupt separation of each of the tube feed platforms 21 from its corresponding tube 2 when the feeding operation has been completed. Since the tube holding chucks 6 regrip the tubes after the tube feeding operation, it is important to avoid dragging the tube end across its platform cap 26. This dragging action tends to break or chip the tube ends.

As best shown in FIGS. 1 and 6, the tube feeding cam 41 is provided with an abrupt shoulder 42a which coincides with the end of the feeding zone A. After the tube holding chuck 6 regrips its tube 2 the platform cam follower 28 moves over the abrupt shoulder 42a and drops down out of engagement with the lower end of the tube. In this manner the tube is protected against breakage during this important part of the tube feeding operation.

The feed cam then moves each platform 21 upward along return surface 43 for each new feed cycle. Preferably, the feed cam 41 includes spaced cam segments 44a and 44b, which are connected by a pair of cam links 45. The cam links 45 not only provide for adjustment of one cam segment with respect to the other but the links 45 also provide continuity of cam surface between the cam segments.

FIGS. 2, 3 and 4 illustrate the arrangement for supporting the tube feed mechanism 20 in a position beneath the glass tubes 2. These figures further illustrate the preferred arrangement for rotating the sprockets 36 and 37, and for adjusting the tension in the platform drive chain.

Referring to FIGS. 2 and 3 the tube feed mechanism 20 is mounted on the glass cutting machine 46 by means of a suitable bracket 47 and support post 48. If desired, the support post 48 may be adjusted with respect to the mounting bracket 47 by a suitable clamp and bolt arrangement 49. As shown in FIG. 2, the support post 48 carries a pair of horizontal bars 50 upon which drive sprocket housing 51 and 52 are mounted. Each housing 51 and 52 (FIGS. 3 and 4) supports a sprocket drive shaft 53 and 54 for rotary motion. While each sprocket 36 and 37 may be separately driven, I prefer to drive only the sprocket 36 (by gear 55, FIG. 2) while the other sprocket 37 serves as an idler. I prefer this so that the idler sprocket 37 may be used to adjust the tension in the platform drive chain 25. As shown in FIGS. 3 and 4, the idler sprocket housing 52 is slidably mounted at journals 56 on the horizontal bars 50. Suitable bolts 57 may be used to take up slack in the chain 25 by increasing the distance between sprockets. By this arrangement, the drive chain may be held in a taut condition to prevent lashing of the chain.

The movement of the chain 25 is further controlled by a guide bar 58 which steadies the chain as it passes through the feed zone. As shown in FIG. 2, the guide bar 58 engages the central part 59 of each swivel joint 22 to prevent lashing of the chain in this critical zone of platform movement. The guide bar is mounted on the horizontal bar 50 by means of an adjustable arm 60.

The supporting arrangement for the feed cam 41 is shown best in FIGS. 2 and 3 and includes suitable brackets 61 adjustably mounted on the sprocket spindle housings 51 and 52. It will be observed that the contour of the feed cam 41 and the length of tube feed can be adjusted by repositioning each bracket 61 with respect to the other on housings 51 and 52.

The operation of the tube feeding mechanism will now be summarized.

Referring to FIG. 1 the tube carrying turret 1 and tube feed mechanism 20 move in the direction of the arrows 3 shown at the left of FIG. 1. Each tube 2 registers with a platform 21 for movement together toward the feed zone A. A tube 2 and its corresponding platform 21 enter the feed zone A as shown in FIG. 5. The chuck opening cam 7 opens chuck 6 and the tube 2 drops a short distance onto the platform cap 26. The platform 21 at this point is in an elevated position for receiving the tube.

The linear movement through the feed zone of both the tube and the platform is best shown in FIG. 4. The tube 2 moves through a slightly arcuate path shown by broken line D. The platforms 21 move through a straight line under the guidance of the platform guide bar 58.

Referring again to FIG. 1, the platforms 21 in passing through the feed zone A move down the incline surface 42 of the feed cam 41 and guide each tube 2 through a predetermined feed length. The tubes 2 are loosely held during the feeding operation by their respective chucks 6 and are fed by gravity.

FIG. 6 illustrates the position of a tube 2 and platform 21 as they approach the end of the feeding zone A. It will be noted here that the chuck jaws 8 are still open and will close when the chuck 6 moves clear of chuck cam 7. As the chuck 6 moves clear of the cam 7, the platform cam 28 follower arrives at the abrupt shoulder 42a in the feed cam 41 and the platform drops abruptly over the shoulder 42a to provide for quick separation of the tube 2 and its platform 21 after the feeding operation. This feature of the invention prevents chipping or breaking of the tube at the end of the feeding operation.

As the chuck 6 and tube 2 move clear of the feed zone A the chuck jaws 8 close and carry the tube 2 to the cutting station indicated at B in FIG. 7. Here by means of a suitable cutting tool and flame C, a tube segment 2A is severed from the main tube body 2.

Referring once again to FIGS. 1 and 3 the tube feed mechanism 20 can be adjusted as desired to cut tube segments of lesser or greater length. To cut the tube segment of lesser length it is simply necessary to move cam segment 44a upward slightly with respect to segment 44b. This may be done as shown in FIG. 3 by adjusting bracket 61 slightly upward on housing 51. To cut tubes of greater length it is simply necessary to lower the entire tube feed mechanism 20 as desired by means of support post 48 and clamp 49.

It will be seen therefore that a new and improved glass tube feeding machine is provided wherein glass tubes are handled with great care in a machine capable of high speeds. By providing a gradual tube feed a machine results which minimizes tube breakage or chipping during this critical part of the tube operation.

The machine of the present invention is suited to the production of different size glass tubes by providing an elevator mechanism which may be adjusted over a wide range.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a tube cutting machine the combination comprising means for moving and releasing a series of vertically disposed tubes, means for registering with and guiding the released tubes to a predetermined level and means for moving said registering and guiding means in synchronism with said moving and releasing means.

2. In a tube cutting machine the combination comprising means for moving and releasing a series of vertically disposed elongated tubes, means for rotating the tubes, means for registering with and guiding the tubes to a predetermined level, said guiding means including a platform adapted to rotate freely when guiding each rotating tube.

3. In a tube cutting machine the combination comprising means for moving and releasing a series of elongated tubes, means for registering with each tube for moving each tube from a first level to a second level, means for moving said registering means in synchronism with said moving and releasing means and means cooperating with the registering means for gradually guiding the tubes between said levels.

4. An apparatus for presenting a predetermined length of a tube to a cutting tool at a cutting station comprising the combination of means for moving a tube to a cutting station, means for releasing the tube on said moving means at a predetermined point in the travel of the tube toward the cutting station, means for engaging one end of the tube at said predetermined point and for guiding the tube to a predetermined position to adjust the length of tube to be presented to the cutting tool at the cutting station, and means for moving said engaging and guiding means in synchronism with said tube moving means.

5. An apparatus for presenting a predetermined length of a tube to a cutting tool at a cutting station comprising the combination of means for moving a vertically disposed tube to a cutting station, means for releasing the tube on said moving means at a predetermined point in the travel of the tube toward the cutting station, a mechanism moving in timed relationship to said moving means for engaging one end of the tube at said predetermined point, means for guiding the tube to a predetermined level to adjust the length of tube to be presented to the cutting tool at the cutting station.

6. An apparaus for presenting a predetermined length of a tube to a cutting tool at a cutting station comprising the combination of means for moving a vertically disposed tube to a cutting station, means for releasably supporting the tube on the moving means, means for releasing the tube from said supporting means for a predetermined portion of the travel of the tube toward the cutting station, a mechanism for moving in timed relationship to said moving means and for engaging one end of the tube at said predetermined point, means for guiding the mechanism to a predetermined level to adjust the length of tube to be presented to the cutting tool at the cutting station.

7. An apparatus for presenting a predetermined length of a tube to a cutting tool at a cutting station comprising the combination of a rotatable table for moving a series of tubes to a cutting station where a segment is cut from each tube, means for releasably supporting the tubes on the rotatable table, means for releasing each of the tubes from said supporting means at a predetermined point in the travel of the tube toward the cutting station, a mechanism for moving in timed relationship to said rotatable table and for engaging one end of each tube at said predetermined point, means for lowering each glass tube to a predetermined level to adjust the length of the tube segment to be presented to the cutting tool at the cutting station, said supporting means resupporting the tube on the rotating table after adjusting the tube length.

8. An apparatus for presenting a predetermined length of a tube to a cutting tool at a cutting station comprising the combination of means for moving a series of tubes to a cutting station where a segment is cut from each tube, means for releasably supporting the tubes on the moving means, means for releasing each of the tubes from said supporting means as each tube travels toward the cutting station, a mechanism for moving in timed relationship to said moving means, a plurality of platforms on said mechanism for engaging one end of each of the tubes after release by said supporting means, means for lowering each platform to a predetermined level to adjust the length of a segment to be cut from each tube, and said supporting means being adapted to support the tube on the tube moving means after adjusting the tube length.

9. An apparatus for presenting a predetermined length of a tube to a cutting tool at a cutting station comprising the combination of a rotating table for moving a series of tubes to a cutting station, means for releasably supporting each of the tubes on the rotating table, means for releasing each of the tubes from said supporting means at a predetermined point in the travel of the tube toward the cutting station, a mechanism for moving in timed relationship to said rotating table, a plurality of platforms on said mechanism for supporting the tubes after release by said supporting means, a cam follower connected to each of the platforms, a cam surface cooperating with the cam followers for lowering each platform to a predetermined level to adjust the length of a segment of each tube to be presented to a cutting tool at the cutting station, and means for supporting the tube on the rotating table after adjusting the tube length.

10. An apparatus for presenting a predetermined length of a tube to a cutting tool at a cutting station comprising the combination of a rotatable table for moving a series of tubes to a cutting station, a plurality of gripping chucks for releasably supporting the tubes in a vertical position on the rotating table, means cooperating with said chucks for releasing the tube from the grip of the chucks at a predetermined point in the travel of the tube toward the cutting station, a mechanism for moving in timed relationship to said rotating table, said mechanism including a plurality of platforms for engaging the lower end of the tubes and for supporting each tube after being released from the grip of the chuck, a cam follower associated with each platform, a cam surface cooperating with each of the cam followers for lowering each platform to a predetermined level to adjust the length of a segment of each tube to be presented to a cutting tool at the cutting station, and means cooperating with said chucks whereby the chucks regrip and support the tubes after adjusting the tube length.

11. In a tube cutting machine having a rotatable table for moving a series of vertically disposed tubes to a cutting station and having a plurality of chucks for releasably gripping and supporting the tubes on the table and having a mechanism cooperating with the chucks for releasing each tube from the grip of a chuck as the tube moves toward a cutting station, the improvement which comprises a mechanism for supporting each tube after release from a chuck, said mechanism including a plurality of platforms for supporting the tubes, means for moving the platforms in timed relation to the moving tubes, and means for lowering each platform a predetermined distance whereby a segment of tube of given length is presented to the cutting tool at the cutting station, and means cooperating with the chucks whereby each chuck regrips a tube after the tube is lowered.

12. In a tube cutting machine having a rotatable table for moving a series of vertically disposed tubes to a cutting station and having a plurality of chucks for releasably gripping and supporting the tubes on the table the improvement which comprises a mechanism cooperating with the chucks for releasing each tube from the grip of a chuck as the tube moves toward a cutting station, a mechanism for supporting each tube after release from a chuck, said mechanism including a plurality of platforms for supporting the tubes, means for moving the platforms in timed relation to the moving tubes, and means for lowering each platform a predetermined distance whereby a segment of tube of given length is presented to the cutting tool at the cutting station, and means cooperating with the chucks whereby each chuck regrips a tube after the tube is lowered.

13. A mechanism for cutting tubes into segments comprising the combination of means for moving a plurality of tubes through a closed path, releasable support means for gripping and supporting the tubes in a vertical orientation on said rotating means, means cooperating with said tube supports for releasing the grip of each support on a tube whereby the tube is free to move vertically, a mechanism for moving in timed relation with respect to the movement of the tubes, a plurality of platforms mounted on the mechanism for movement between upper and lower positions, each of said platforms being adapted to engage a tube and support the tube after release from said tube supporting means, means for lowering the platforms so that each tube is lowered a predetermined distance related to the length of the segment to be cut from the tube, means cooperating with the tube support for regripping and supporting the tubes as they move from the platforms to the cutting station, and means for cutting a segment from each tube.

14. A mechanism for cutting tubes into segments comprising the combination of means for moving a plurality of tubes in a closed path, a plurality of releasable support chucks for gripping and supporting the tubes in a vertical orientation on said rotating means, means cooperating with said tube supports for releasing the grip of each support on each tube whereby the tube is free to move vertically, tube feed mechanism for moving in timed relation with respect to the movement of the tubes, a plurality of platforms mounted on the mechanism for movement between upper and lower positions, each of said platforms being adapted to engage a tube and support the tube after release from said tube supporting means, a cam follower connected to each of said platforms, a cam cooperating with each of said followers for lowering the platforms so that each tube is lowered a predetermined distance corresponding to the length of the segment to be cut from the tube, means cooperating with the tube support for regripping and supporting the tubes as they move from the platforms to the cutting station, and means for cutting a segment from each tube.

15. A mechanism for cutting tubes into segments comprising the combination of means for moving a plurality of tubes through a closed path, releasable support means for gripping and supporting the tubes in a vertical orientation on said rotating means, means cooperating with said tube supports for releasing the grip of each support on a tube whereby the tube is free to move vertically, a mechanism for moving in timed relation with respect to the movement of the tubes, a plurality of platforms mounted on the mechanism for movement between upper and lower positions, each of said platforms being adapted to engage a tube and support the tube after release from said tube supporting means, a cam follower connected to each of the platforms, a cam for engaging and guiding the platforms so that each tube is lowered a predetermined distance related to the length of the segment to be cut from the tube, said cam including two cam segments connected by a pair of cam links whereby the length of tube to be cut can be varied by adjusting the vertical displacement of the cam segments, means cooperating with the tube support for regripping and supporting the tubes as they move from the platforms to the cutting station, and means for cutting a segment from each tube.

16. A mechanism for cutting tubes into segments comprising the combination of means for moving a plurality of tubes through a closed path, releasable support means for gripping and supporting the tubes in a vertical orientation on said rotating means, means cooperating with said tube supports for releasing the grip of each support on a tube whereby the tube is free to move vertically, a mechanism for moving in timed relation with respect to the movement of the tubes, a plurality of platforms mounted on the mechanism for movement between upper and lower positions, each of said platforms being adapted to engage a tube and support the tube after release from said tube supporting means, a cam follower connected to each of the platforms, a cam for engaging and guiding the platforms so that each tube is lowered a predetermined distance related to the length of the segment to be cut from the tube, said cam including two cam segments connected by a pair of cam links whereby the length of tube to be cut can be varied by adjusting the vertical displacement of the cam segments, said cam further including a shoulder for providing abrupt separation of each tube from its corresponding platform, means cooperating with the tube support for regripping and supporting the tubes as they move from the platforms to the cutting station, and means for cutting a segment from each tube.

17. An apparatus for presenting a predetermined length of a tube to a cutting tool at a cutting station comprising the combination of means for moving a tube to a cutting station, means for releasably supporting the tube on the moving means, means for releasing the tube from said supporting means for a predetermined portion of the travel of the tube toward the cutting station, a mechanism including a cam follower for moving in timed relationship to said moving means and for engaging one end of the tube at said predetermined point, means for guiding the mechanism to a predetermined level to adjust the length of tube to be presented to the cutting tool at the cutting station, said guiding means including a pair of cam segments connected by a pair of cam links whereby the guiding means may be adjusted in total vertical displacement.

18. A mechanism for guiding tubes from a first position to a second position comprising a closed chain for moving in a closed path, the chain including a plurality of individual links defining hollow joints at their connecting points, a spindle mounted for free vertical movement in each joint, means at one end of each spindle for engaging and guiding an elongated tube between first and second vertical positions, a cam follower mounted on the other end of said spindle, and a cam surface cooperating with said cam follower for guiding the spindle between said vertical positions.

19. The mechanism in claim 18 wherein the cam surface comprises a pair of spaced cam segments which are connected by a pair of cam links whereby the vertical displacement of the spindles may be adjusted.

20. The mechanism in claim 18 wherein the engaging and guiding means is rotatably mounted on said spindle.

21. The mechanism in claim 18 which further includes means for adjusting the tension in said chain.

References Cited
UNITED STATES PATENTS

| | | | |
|---|---|---|---|
| 1,123,336 | 1/1915 | Madden | 225—96.5 |
| 2,093,147 | 9/1937 | Eisler | 225—96.5 |
| 2,297,149 | 9/1942 | Houck et al. | 225—96.5 |

ANDREW R. JUHASZ, *Primary Examiner.*